United States Patent [19]
Hulsebus et al.

[11] 3,741,077
[45] June 26, 1973

[54] PISTON ASSEMBLY

[75] Inventors: Alan D. Hulsebus, Tekonsha; Roger J. Benkovic, Marshall, both of Mich.

[73] Assignee: Eaton Corporation, Cleveland, Ohio

[22] Filed: Apr. 24, 1972

[21] Appl. No.: 246,967

[52] U.S. Cl............................ 92/57, 92/12.2, 92/158, 92/248
[51] Int. Cl............................................. F01b 13/04
[58] Field of Search........................ 92/12.2, 57, 158, 92/172, 222, 248, 249, 255, 256; 91/485, 486, 487

[56] References Cited
UNITED STATES PATENTS

| | | | |
|---|---|---|---|
| 2,429,426 | 10/1947 | Phillips et al. | 92/249 X |
| 2,980,077 | 4/1961 | Magill | 92/255 X |
| 3,080,854 | 3/1963 | Wiggermann | 92/169 X |
| 3,166,991 | 1/1965 | Blenkle | 92/249 X |
| 3,187,644 | 6/1965 | Ricketts | 92/57 X |
| 3,319,575 | 5/1967 | Havens | 92/255 X |
| 3,633,467 | 1/1972 | Maketo Watanabe et al. | 92/248 X |

*Primary Examiner*—Martin P. Schwadron
*Assistant Examiner*—Abe Hershkovitz
*Attorney*—Joseph R. Teagno et al.

[57] ABSTRACT

An improved hydraulic device includes a piston assembly having a metallic body with an internal cavity. The cavity is filled with a molded polymeric filler material. The molded polymeric filler material has a mass per unit volume which is less than the mass per unit volume of the metallic body and has a higher bulk modulus than hydraulic fluid utilized in association with the piston assembly. The filler material is retained in the cavity during reciprocation of the piston assembly by an end plate or cap which is welded to one end of the body at an entrance to the internal cavity. The filler material may extend through an opening in the end plate to prevent opposite sides of the end plate from being exposed to fluid pressure.

9 Claims, 4 Drawing Figures

PATENTED JUN 26 1973　　　　　　　　　　　　　　　3,741,077

PISTON ASSEMBLY

BACKGROUND OF INVENTION

This invention relates to a piston assembly for use in a hydraulic device.

Hydraulic pistons of the same general purpose as the invention of the present application are shown in U. S. Pat. Nos. 3,080,854 issued March 12, 1963 to G. Wiggerman; 3,187,644 issued June 8, 1965 to C. J. Ricketts and 3,319,575 issued May 16, 1967 to A. L. Havens.

Wiggerman discloses a hydraulic machine including axially movable filled pistons. Wiggerman discloses that prior to his invention, it was customary to make hydraulic pistons as hollow cylinders in order to reduce the weight thereof and as a result of the weight reduction to reduce the centrifugal and inertial forces and resultant wear of the hydraulic machine and pistons and permitted an increase in the operating speeds of such machines. Wiggerman also points out, however, that hollow pistons increase the amount of ineffective hydraulic fluid within the piston and cylinder of the hydraulic machine thereby decreasing the volumetric efficiency. Wiggerman discloses filling a hollow cylindrical hydraulic piston with a lightweight filler material. The filler material was encapsulated in a metal jacket which formed the piston. Wiggerman's filler material is disclosed as having an elasticity smaller than that of the hydraulic working fluid. Wiggerman provides a clearance between his filler material and the encapsulating jacket and communicates the clearance with the working fluid pressure in order to provide a pressure balance across the jacket to reduce the thickness of the jacket necessary to perform a satisfactory pumping or motoring function at high fluid pressures. The clearance between the filler material and jacket in Wiggerman is used to take up the excess thermal expansion of the filler material and prevent undue stress in the jacket due to the difference in rates of thermal expansion. Wiggerman discloses that the filler material may be held in place within the piston body by a cross pin or alternatively the filler material is held in place within the piston by screw threads.

Ricketts U.S. Pat. No. 3,187,644 discloses a cylindrical hollow hydraulic piston body having a lightweight inert filler material therein. Ricketts discloses preventing axial movement of the filler material relative to the piston body by means of filler material engagement with a circumferentially extending groove in the piston and preventing rotary movement of the filler material with respect to the piston body by having the filler material engaging a substantially axial groove in the piston body. Ricketts' piston has a passage through the filler material for permitting hydraulic fluid to the piston slipper shoes for lubrication and hydraulic balancing thereof.

Havens, U.S. Pat. No. 3,319,575 discloses a piston for a hydraulic machine wherein the piston includes an annular hollow chamber defined by the piston body and an end cap. The Havens piston includes a passage therethrough and a restriction in the passage for controlling fluid flow to the piston slipper.

SUMMARY OF THE PRESENT INVENTION

A hydraulic device constructed in accordance with the present invention includes a rotatable cylinder block having cylinders in which pistons are slidably disposed. Each of the pistons includes a metallic body having an interior cavity which is substantially filled with a molded polymeric material. The molded polymeric material has a density or mass per unit volume which is less than the density or mass per unit volume of the metal body to thereby reduce the weight of each piston from the weight it would have if it was made entirely of metal. This reduction in the weight of a piston reduces inertia forces which result upon reciprocation of the piston in the cylinder block. In addition, the molded polymeric filler material has a bulk modulus which is higher than the bulk modulus of hydraulic fluid received in a pressure chamber formed between the piston and a cylinder wall. The molded polymeric filler material is retained in the piston by an end plate or cap which is securely welded to the metal body of the piston.

Accordingly, it is an object of this invention to provide a new and improved hydraulic device having a hollow piston body which is filled with a molded polymeric material and wherein the polymeric material is retained in the piston body by an end plate or cap which is securely welded to the body of the piston.

Another object of this invention is to provide a new and improved hydraulic device which includes a rotatable cylinder block having cylinders which cooperate with reciprocable pistons to form pressure chambers to receive hydraulic fluid and wherein each of the pistons includes a metallic body having an interior cavity which is substantially filled with a molded polymeric material having a lower mass per unit volume than the metal of the piston body and a higher bulk modulus than the hydraulic fluid received in the pressure chambers, an end plate or cap is welded to the body and retains the molded polymeric material in the cavity during reciprocation of the piston.

Another object of this invention is to provide a new and improved hydraulic device which includes a rotatable cylinder block having cylinders which cooperate with reciprocable pistons to form pressure chambers to receive hydraulic fluid and wherein each of the pistons includes a metallic body having an interior cavity which is substantially filled with a molded polymeric material having a lower mass per unit volume than the metal of the piston body and a higher bulk modulus than the hydraulic fluid received in the pressure chambers, and an end plate or cap which retains the molded polymeric filler material in the cavity and has an opening through which the polymeric material and a passage for conducting hydraulic fluid extends.

DESCRIPTION OF THE DRAWINGS

These and other objects and features of the present invention will become more apparent upon a consideration of the following description taken in connection with the accompanying drawings wherein.

Figure 1:
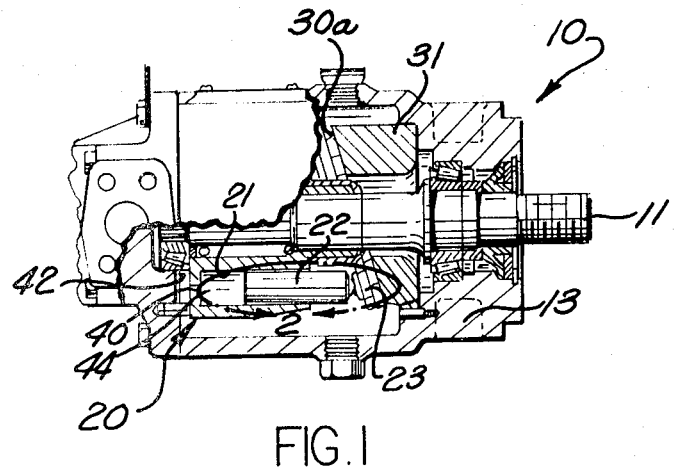
FIG. 1 is a fragmentary sectional view of a hydraulic device constructed in accordance with the present invention.

DESCRIPTION OF PREFERRED EMBODIMENTS OF THE INVENTION:

The present invention relates to an improved hydraulic fluid device of the axial piston type. The present invention may be applied to a pump or motor unit of either fixed or variable displacement. As shown in the drawings, the invention is applied to a fixed displacement hydraulic motor, but it should be understood that the invention is equally applicable to a variable displacement motor or a fixed or variable displacement pump.

As shown in FIG. 1 of the drawings, the fixed displacement axial piston fluid motor is generally designated 10. The fluid motor 10, as is well-known, has an output shaft 11 which may be suitably connected for driving a load. A housing 13 encloses a cylinder block 20 which is drivingly connected to the shaft 11 and contains a plurality of piston receiving cylinders or bores 21 arranged in a circular array around the shaft 11. A piston 22 is slidably disposed in each of the cylinders 21.

The outer end of each piston 22 is connected with a respective slipper 23 and, specifically, a spherical outer end 24 (FIG. 2) of each piston 22 is connected in a spherical recess 25 in a slipper 23. Each slipper 23 has a bearing surface 30 which is engageable with a bearing reaction surface 30a (FIG. 1) on a swash or thrust plate 31. In accordance with a well-known practice, the reaction surface 30a is inclined relative to the longitudinal axis of the shaft 11 and the longitudinal axes of the pistons 22.

Each of the cylinders 21 has a port 40 which communicates with ports in a valve plate 42. The valve plate 42 is provided, as is well-known, with ports for communicating high pressure fluid received from a suitable pump to the cylinders 21 and for communicating the cylinders with a suitable fluid return conduit. In response to fluid flow into pressure chambers 44 formed by cooperation between the pistons 22 and cylinders 21, the pistons 22 are reciprocated axially to impart rotational movement to the cylinder block 20 in a well-known manner. This rotation of the cylinder block 20 is transmitted to the output shaft 11 which is fixedly connected with the cylinder block. To avoid prolixity of description, the well-known general mode of operation and construction of the motor unit 10 will not be further described herein.

The pistons 22 have a hollow metallic body 50 which defines an axially extending cavity 52 filled with a relatively lightweight molded polymeric material 54. In accordance with a feature of the present invention, the molded polymeric material 54 is retained in place by an end plate or cap 56. The end plate or cap 56 is welded to one end of the piston body 50.

The piston body 50 includes a cylindrical wall or shell 60 which is integrally formed with the spherical end portion 24 and has an outer surface 62 which is disposed in sliding engagement with the walls of a cylinder 21. The generally cylindrical cavity 52 extends from an opening 66 at the inner end of the body 50 to a circular end surface 68 which is adjacent to the spherical outer end portion 24 of the integrally formed metallic piston body 50.

During assembly of the piston 22, the polymeric material 54 is injection molded into the cavity 52 under sufficient pressure to fill all of the voids within the cavity 52. Therefore, the filler material 54 assumes the cylindrical configuration of an inner surface 70 of the cavity 52 and is disposed in a coaxial relationship with the hollow piston body 50. However, it is contemplated that under certain circumstances it may be desirable to premold the filler material 54 and insert it as a solid body into the cavity 52.

The molded polymeric material 54 has a mass per unit volume which is less than the mass per unit volume of the metallic piston body 50 so that the piston 22 is ligher than it would be if it were made entirely of metal. In addition, the molded polymeric material 54 has a bulk modulus which is higher than the bulk modulus of the hydraulic fluid which is received in the pressure chambers 44. This relatively high bulk modulus of the molded polymeric material 54 reduces bulk modulus losses during operation of the motor unit 10. Although it is contemplated that the molded polymeric material 54 may have many different compositions, in one specific preferred embodiment of the invention "DUREZ" plastic No. 23570 obtained from Durez Division of Hooker Chemical Corporation at North Tonawanda, N.Y. was utilized as the molded polymeric material 54 in order to obtain the desired density and bulk modulus characteristics. Also Fiberite FM-4003 obtained from Fiberite Corporation, Winona, Minn., may be used.

The end plate 56 includes a circular inner surface 76 which is disposed in abutting engagement with an annular end face 80 of the piston body 50 and with an end surface of the polymeric material 54. The outer surface of the end plate 56 is exposed to the fluid pressure in the chamber 44. A weld 85 circumscribes the end plate 56 and connects it to the piston body 50.

In accordance with well-known practices, a passage 90 (see FIG. 2) extends through the piston 22 to conduct hydraulic fluid from the pressure chamber 44 to the slipper 23. The passage 90 is formed by a cylindrical inner surface 92 of the molded polymeric material 54 and a cylindrical inner surface 94 of the metallic piston body. An orifice 98 in the passage 90 restricts fluid flow to the slipper 23 and provides for a differential in pressure between the chamber 44 and the slipper. This pressure differential presses the piston 22 and slipper 23 against the thrust or cam plate 31 in a known manner.

The piston 22 is advantageously constructed by injection molding the polymeric material into the cavity 52 under sufficient pressure to fill all the voids in the cavity. During the assembly of the piston 22 the end plate 56 is first welded, by resistance welding techniques or other suitable processes, to the end face 80 of the piston body 50. A core rod is then inserted through an opening 100 in the end plate 56 into the portion of the passage 94 in the metal body 50. Molded polymeric material is then injected into the cavity 52 under sufficient pressure to fill all of the voids in the cavity.

Figure 2:
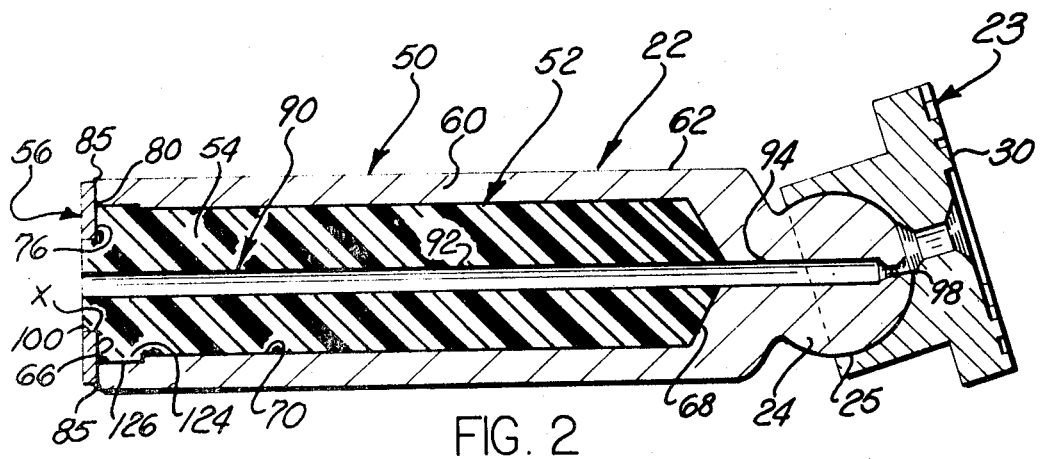
FIG. 2 is an enlarged sectional view of a piston assembly which is utilized in the hydraulic device of FIG. 1.
Figures 3, 4:
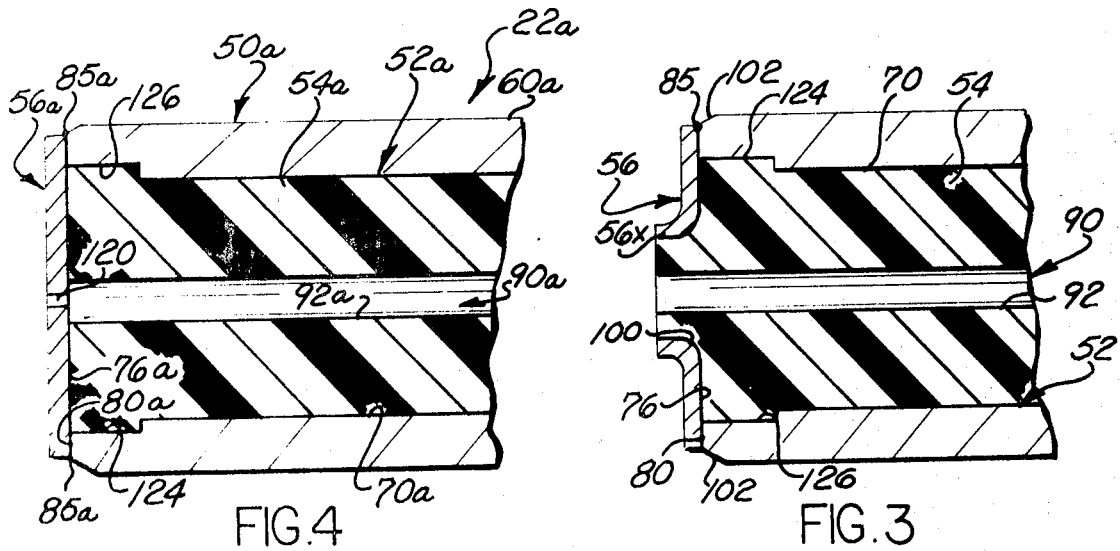
FIG. 3 is an enlarged fragmentary sectional view of one end portion of the piston assembly similar to that of FIG. 2 but of a modified construction illustrating the relationship between a hollow body of the piston assembly, molded polymeric filler material, and an end plate or cap which is welded to the body and retains the filler material in the body upon reciprocation of the piston assembly.
FIG. 4 is an enlarged fragmentary sectional view, general similar to FIG. 3, depicting another embodiment of the piston assembly.

In the embodiment of the invention illustrated in FIGS. 2 and 3, a relatively large central opening 100 is provided in the end plate 56 to enable molded polymeric material 54 to be injected around the core rod for forming the cylindrical surface 92 of the passage 90 and into the cavity 52. Of course, once the material 54 is solidified, the core rod is withdrawn. The molded polymeric material 54 and passage 90 then extend through the opening 100 in the end plate 56. This construction of the piston 22 is particularly advantageous since the inner surface 76 of the plate 56 is not exposed to hydraulic fluid.

To reduce wear on the walls of the cylinder 21, the inner end portion of the piston body 50 is chamfered at 102 so that the weld 85 is disposed radially inwardly of the outer surface 60 of the piston body. In addition, the chamfer 102 prevents wear which will result if a square shoulder is provided at the end of the piston 22.

The molded polymeric material 54 has a larger coefficient of expansion and contraction than does the metallic body 50 for the piston 22. Therefore, after the molded polymeric material has been injected into the cavity 52 and solidifies, the molded polymeric material 54 shrinks somewhat relative to the piston body 50. This shrinkage enables the molded polymeric material 54 to move relatively small distances in an axial direction relative to the piston body 50 as the piston body is reciprocated in the cylinder block 20. In order to reduce the axial movement of the molded polymeric material 54, the recess 52 is provided with a relatively large diameter portion 124 in which the polymeric material flows while being injected into the cavity 52. The relatively large diameter portion 124 has an axial extent which is far shorter than the axial extent of the cavity 52. Therefore, the axial length of the material in a portion 124 of the cavity 52 is smaller than the total axial length of the cavity 52. This results in a relatively small axial shrinkage of the polymeric material 54 in the portion 124 of the cavity 52 so that axial movement of the solidified polymeric material 54 in the chamber 52 is reduced.

The embodiment of the present invention which is illustrated in FIG. 3 is similar to the embodiment shown in FIG. 2 and similar reference numerals are applied to the embodiment in FIG. 3 as to the embodiment of FIG. 2. The basic difference between the two embodiments is that in the embodiment of FIG. 3, the end plate or cap 56 is flared at its central loction so as to provide an outwardly flared portion 56x. The outwardly flared portion 56x eliminates the corner designated X in FIG. 2 and thereby eliminates any stresses that may be concentrated in the polymeric material thereat during grinding of the plastic material after the molding thereof. During the grinding operation the plastic material is removed in order to provide the finish shown in FIG. 2 as well as in FIG. 3. In the embodiment of FIG. 2, the grinding is somewhat difficult due to the fact that the plastic material at times tends to crumble as it is being ground. In the embodiment of FIG. 3, the flared portion tends to reduce this crumbling tendency, since a grind cut of both the end plate and the plastic material can be taken and due to the elimination of the corner X stresses are not concentrated in the polymeric material thereat.

In the embodiment of the invention, illustrated in FIG. 4, the orifice 98 is omitted and the opening through the end plate or cap restricts fluid flow from the pressure chamber 44. The embodiment of the invention shown in FIG. 4 is of a construction which is similar to the construction of the embodiments shown in FIGS. 2 and 3, and similar components will be designated with similar numerals, the suffix letter *a* being associated with the numerals utilized to designate components of FIG. 4.

In the embodiment of FIG. 4, the end plate 56a is provided with a relatively small circular opening 120 which restricts fluid flow through a passage 90a to provide a pressure drop between the chamber 44 and the slipper (not shown). Since the opening 120 is relatively small, the end plate 56a must be welded at 85a to the hollow piston body 50a after the polymeric material 54a is injected into the cavity 52a. Thus, during assembly of the piston 22a, the rod for forming the passage 90a is positioned in a coaxial relationship with the cylindrical body 50a. The molded polymeric material is then injected into the cavity 52a. Once the material 54a is solidifed, the rod is withdrawn. The end plate 56a is then welded to the piston body 50a.

In view of the foregoing description, it is apparent that each of the pistons 22 has a generally cylindrical body having an outer surface 62 which is disposed in sliding engagement with an associated one of the cylinders 21. A longitudinally extending cavity 52 is formed in the piston body 50 and is filled with a molded polymeric material 54. This polymeric material has a lower mass per unit of volume or density than the metal forming the body 50 to reduce the weight of the piston below the weight it would have if it was formed entirely of metal. In addition, the molded polymeric material 54 has a bulk modulus which is higher than the bulk modulus of the hydrophilic fluid utilized in association with the motor unit 10 in order to reduce bulk modulus losses during operation of the motor unit.

In accordance with a feature of the present invention, the molded polymeric material 54 is retained in the cavity 52 by an end plate 56. The end plate 56 is welded to the piston body 50 and is disposed in abutting engagement with the molded polymeric material 54 to retain the polymeric material in the cavity 52 during reciprocation of the piston 22. In one specific embodiment of the invention, the end plate is provided with an orifice 120 which restricts fluid flow from the chamber 44 into the passage through the piston to thereby provide a pressure differential urging the piston and slipper 23 against the swash plate 31. In another specific embodiment of the invention, the end plate is provided with a relatively large opening through which the polymeric material 54 extends to thereby prevent the inner surface of the end plate 56 from being exposed to fluid at one pressure and the other surface of the end plate 56 from being exposed to fluid at a different pressure during rotation of the cylinder block 20. In still another embodiment, the end plate is flared at its center to enable grinding to be accomplished in an efficient manner and to reduce a stress riser in the polymeric material. The cavity 52 can, in all embodiments of the invention, be provided with an enlarged portion having a relatively short axial length so that axial shrinkage of the polymeric material in this portion of the cavity is minimized.

Having described specific preferred embodiments of the invention, the following is claimed:

1. A hydraulic device comprising a cylinder block, means supporting said cylinder block for rotation about its central axis, a plurality of longitudinally extending cylinders formed at spaced apart locations in said cylinder block, each of said cylinders having a longitudinal axis extending generally parallel to the central axis of said cylinder block, a thrustplate having a reaction surface extending transversely to the longitudinal axes of said cylinders, a plurality of pistons each of which is disposed in and reciprocatable relative to an associated one of said cylinders and has an inner end portion cooperating with a wall of the associated cylinder to at least partially define a pressure chamber for receiving hydraulic fluid, a plurality of slippers each of which is disposed in engagement with an outer end portion of an associated one of said pistons and has a bearing surface disposed in sliding engagement with said reaction surface on said thrustplate, each of said pistons including a generally cylindrical metallic body having an outer surface disposed in sliding engagement with an inner surface of an associated one of said cylinders, said metallic body including interior surface means for at least partially defining a longitudinally extending cavity having one end formed by said metallic body adjacent to the outer end portion of the piston and a main opening at the inner end portion of the piston, molded polymeric filler means disposed in and substantially filling said cavity, said molded polymeric filler means having a lower mass per unit volume than the metallic material forming said body and a higher bulk modulus than the hydraulic fluid, passage means extending axially through the piston for conducting hydraulic fluid between the inner and outer end portions of the piston, said passage means including first surface means formed by said molded polymeric filler means and second surface means formed by said metallic body, said first surface means extending from the main cavity opening to said inner end of said cavity, said second surface means extending from the inner end of said cavity to the outer end of the piston, plate means at least partially blocking the main opening to said cavity for retaining said molded polymeric filler means in said cavity during reciprocating movement of the piston in the associated one of the cylinders, said plate means including an inner surface disposed in abutting engagement with said molded polymeric filler means and an outer surface defining a portion of one of said pressure chambers, and weld means for connecting said plate means to said metallic body.

2. A device as set forth in claim 1 wherein said plate means partially blocks said passage means and includes orifice means for restricting fluid flow from the associated one of said pressure chambers into said passage means.

3. A device as set forth in claim 1 wherein said plate means includes surface means for defining an opening extending between said inner and outer surfaces of said plates means, said molded polymeric filler means and said passage means extending through the opening in said plate means.

4. A device as set forth in claim 1 wherein said cavity includes a first portion extending inwardly from the main opening for a first distance and having a first cross sectional area in a plane extending transversely to the longitudinal axis of the piston and a second portion extending inwardly from said first portion for a distance which is substantially greater than said first distance and having a second cross sectional area in a plane extending transversely to the longitudinal axis of the piston which is smaller than said first cross sectional area, said molded polymeric filler means substantially filling both said first and second portions of said cavity and having a coefficient of expansion and contraction greater than that of said metallic body.

5. A device as defined in claim 1 wherein said plate means has a central flared portion receiving said polymeric filler means so that the polymeric filler means engages a smoothly curved surface of said plate means.

6. A hydraulic device comprising a piston having a generally cylindrical metallic body for engaging an inner surface of a cylinder, said metallic body including interior surface means for at least partially defining a longitudinally extending cavity having one end formed by said metallic body adjacent to one end portion of the piston and a main opening at the opposite end portion of the piston molded polymeric filler means disposed in and substantially filling said cavity, said molded polymeric filler means having a lower mass per unit volume than the metallic material forming said body, passage means extending axially through said piston for conducting hydraulic fluid between opposite ends of the piston, said passage means including first surface means formed by said molded polymeric filler means and second surface means formed by said metallic body, said first surface means extending from the main cavity opening to said inner end of said cavity, said second surface means extending from the inner end of said cavity to the outer surface of said piston, plate means connected to said body and at least partially blocking the main opening to said cavity for retaining said molded polymeric filler means in said cavity during reciprocating movement of the piston, said plate means including an inner surface disposed in abutting engagement with said molded polymeric filler means and means for defining an opening through which said molded polymeric filler means and said passage means extends.

7. A device as set forth in claim 6 wherein said cavity includes a first portion having a first longitudinal extent in a direction parallel to the longitudinal axis of the piston and a second portion having a second longitudinal extent which is substantially greater than said first longitudinal extent, said second portion having a greater transverse cross sectional area than said first portion.

8. A device as defined in claim 7 further including weld means for connecting said plate means to said body.

9. A device as defined in claim 6 wherein said plate means has a central flared portion receiving said polymeric filler means so that the polymeric filler means engages a smoothly curved surface of said plate means.

* * * * *